Jan. 9, 1968   R. R. ANDERSON   3,363,190
SENSITIVE LONG TIME CONSTANT BISTABLE AMPLIFIER
Filed Sept. 21, 1964

INVENTOR.
ROBERT R. ANDERSON
BY
Moody and Phillion
ATTORNEYS

United States Patent Office 3,363,190
Patented Jan. 9, 1968

3,363,190
SENSITIVE LONG TIME CONSTANT BISTABLE AMPLIFIER
Robert R. Anderson, Marion, Iowa, assignor to Collins Radio Company, Cedar Rapids, Iowa, a corporation of Iowa
Filed Sept. 21, 1964, Ser. No. 397,817
6 Claims. (Cl. 330—8)

ABSTRACT OF THE DISCLOSURE

A magnetic amplifier circuit for detecting and correcting for error signals, of a predetermined value, which are produced in a system. A timing circuit which includes an active element is coacted with the magnetic amplifier circuit so as to produce the desired result of preventing an error signal, of a predetermined value, from affecting the operation of the overall system.

---

This invention relates generally to magnetic amplifying devices and more particularly to a magnetic amplifier circuit which responds slowly, i.e., has a long time constant, to input signal changes when operating in the negative area of the magnetization curve of its magnetic cores, and which becomes saturated quickly with positive magnetization when the operation crosses into the positive magnetization area of the magnetic cores.

There is a need for a device which will detect error signals but which will not respond quickly to said error signals until said error signals exceed a certain time duration or a certain magnitude. When such error signals exceed such time duration or such magnitude, however, the device should have the characteristic of responding promptly to produce a strong output signal indicating that the error signal has exceeded the limitations imposed upon it, and thereby initiate a warning system. As a specific example, a need for such a device exists in commercial airplanes which employ a dual set of controls. There are two compasses in a commercial plane, one for the pilot and one for the copilot. Due to the characteristics of these compasses, they do not respond exactly alike as the plane executes various maneuvers. Such variations in the readings of the two compasses are normal within certain limitations. However, if the variations between the compasses exceed certain limits, then there probably is a defect in the navigation system in the plane, either with the pilot's or the copilot's instruments, and a warning should be given.

The disparity between the operation of the pilot's compass and the copilot's compass appears in the form of an error signal which can be derived simply by comparing the outputs of the two compasses. Such error signal is then supplied to a suitable detecting device which will function to energize a warning device. A detecting device which will perform such a function must have the characteristics of a long time constant as long as the error signal is below the danger limits but as soon as the error signal exceeds the danger limitations, either in magnitude or in duration of time, then the detecting device should immediately respond thereto to produce a strong output signal which can be employed to activate the warning device.

There are, in the prior art, various type electronic circuits which have characteristics that meet the aforementioned requirements. However, there are no known magnetic circuits which exhibit such characteristics. A magnetic amplifier, for example, exhibiting such characteristics would have advantages over an electronic circuit in that the magnetic amplifier is, under most situations, a more reliable device and needs less maintenance.

An object of the present invention is a magnetic amplifying device for detecting error signals and having a characteristic of bistable operation with time delay characteristics in one of the stable states which prevent input error signals below predetermined magnitudes or time durations from switching the magnetic amplifier to its other bistable state, and which has the further characteristic of very quickly assuming its other bistable state when the said error signal exceeds a predetermined magnitude or a predetermined combination of magnitude and time duration.

A further object of the invention is a bistable magnetic amplifier having a long time constant when operating in the negative feedback region but which will quickly become positively saturated upon crossing the null or zero magnetization point and entering the positive portion of the magnetization curve.

A third purpose of the invention is a magnetic amplifier having bistable operation with rapid operation on the one side of the null operating point and low-pass filter operating characteristic on the other side of the null operating point.

A fourth object of the invention is the improvement of magnetic amplifiers generally.

The conventional magnetic amplifier has at least two cores therein and at least one winding on each core. The windings on the cores are driven by an A-C source through the center tapped secondary winding of a transformer coupling the A-C source to one terminal of the windings. Each of the other terminals of the windings are returned to the center tap of the transformer secondary through an individual series circuit comprised of a diode and a load resistor. Due to the action of the diodes and the polarity with which they are connected, alternate half cycles of the output of the tap secondary transformer will produce current through alternate ones of the windings wound on the two cores.

Input winding means, which may consist of a single winding to which both input and biasing signals are supplied, or separate windings for input and biasing signals, are wound around both of said cores and produce biasing magnetic fluxes through said magnetic cores in such a polarity that the reluctance presented to the current through the driving winding on one of said cores is increased, and the reluctance presented to the current flow through the winding on the other of said cores is decreased. Thus, the total current flowing through one of the driving windings will be greater than that through the other driving winding. The resultant voltages appearing across the respective load resistors associated with the two driving windings will therefor be of different magnitudes. Such difference in voltages is compared and the difference constitutes the output signal of the amplifier. Depending upon which resistor has the greatest D-C voltage thereacross, the resultant voltage will be either positive or negative. Magnetic amplifiers are usually provided with adjusting means so that in the absence of any biasing magnetic flux, the D-C voltage across the two load resistors are equal and the resultant voltage across the two load resistors is zero. Such condition is known as the null operating point of the magnetic amplifier and is so defined herein.

To provide negative feedback, a winding is connected across the output load resistors of magnetic amplifier. Such a winding provides a biasing magnetic flux through the magnetic cores which opposes the magnetic flux produced by the input current supplied to the input windings. The negative feedback winding ordinarily consists of a winding with a portion wound on each of the two cores and with resistance therebetween. The said resistance therebetween determines the amount of negative feedback. More specifically, the smaller the resistance in the negative feedback loop, the greater the current through the negative feedback windings and the less will be the feedback gain impedance, i.e., the impedance gain of the negative feedback loop.

In accordance with the invention, there is provided both a positive feedback circuit and a negative feedback circuit. As indicated above, the negative feedback circuit comprises a negative feedback winding with a resistive portion therein. A time constant circuit comprising a capacitor with a resistive discharge path thereacross is also provided in the negative feedback circuit. Switching means function to connect the time constant circuit across said resistive means when the output signal of the amplifier is negative and to disconnect the time constant circuit from the resistive means when the output signal of the amplifier crosses the null into the positive area of operation. The overall impedance of the negative feedback circuit is such that when the time constant circuit is connected across the resistive means the effect of the negative feedback winding dominates over the effect of the positive feedback winding and the magnetic amplifier operates with negative feedback having low-pass filter type characteristics, i.e., sudden changes in input signals are absorbed by the action of the time constant circuit. On the other hand, when the time constant circuit is disconnected out of the negative feedback circuit, the effect of the positive feedback circuit dominates over the effect of the negative feedback circuit and positive saturation of the amplifier occurs almost immediately. Thus the overall operation of the amplifier is much like a bistable switch, operating in the negative area as a low-pass filter and switching rapidly to positive saturation in the positive area of operation.

In accordance with a feature of the invention the switching means comprises a diode and a transistor, with the diode in series with the time constant capacitor and poled in such a manner as to permit charging of said capacitor when the output of the magnetic amplifier is negative. The transistor is connected across said diode to gate the discharge of said capacitor through the feedback windings and the load resistances of said magnetic amplifier output increases in a positive direction. The base-emitter electrodes of the transistor are connected across the negative feedback circuit resistance to maintain said transistor in a conductive state as long as there is a negative charge on said capacitor.

When the output potential of the magnetic amplifier crosses the null point into the positive region, the said diode is cut off and the capacitor discharged through the transistor. The base-emitter potential difference of the transistor drops below cutoff to make the transistor nonconductive and completely remove the time constant circuit from the operation of the magnetic amplifier.

When the time constant circuit is so removed from the negative feedback circuit, the positive feedback winding functions to increase the magnetic bias in the same polarity as that produced by the input signal current, thus causing rapid saturation of the magnetic amplifier in a positive polarity.

The above-mentioned and other objects and features of the invention will be more fully understood from the following detailed description thereof when read in conjunction with the drawings in which.

Figure 1:
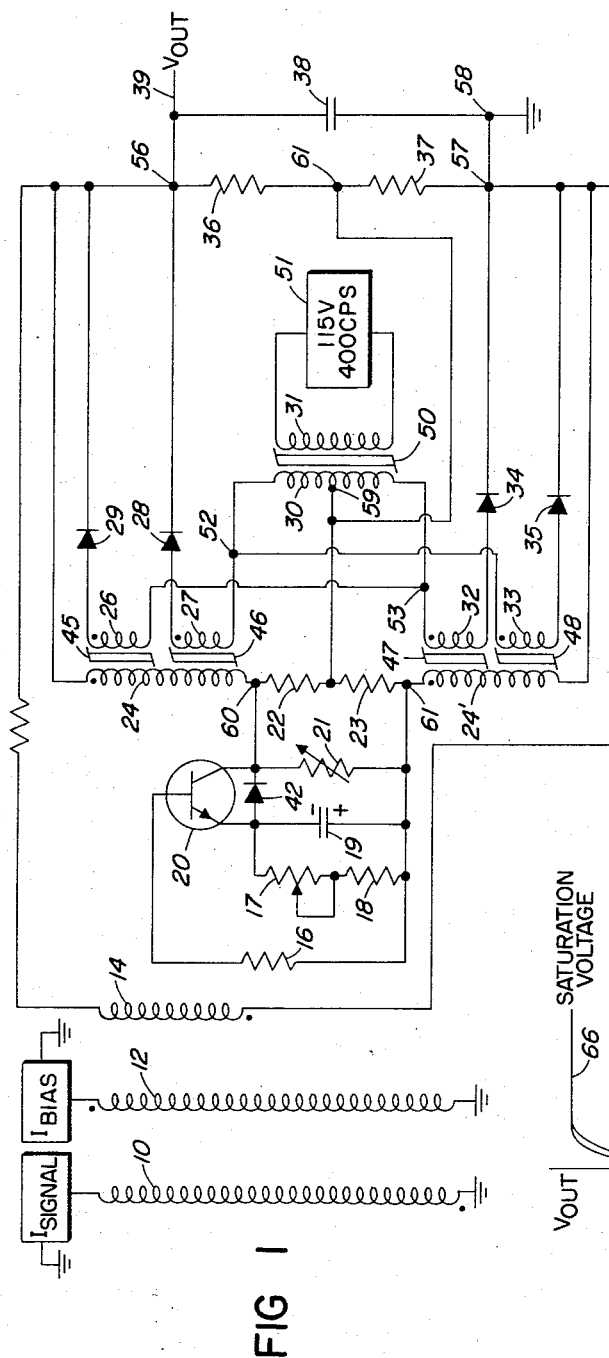
FIG. 1 shows a schematic diagram of the invention.

Referring now to FIG. 1, there are provided four magnetic cores designated by the reference characters 45, 46, 47 and 48. The four cores are divided into two pairs; one pair consisting of cores 45 and 46 and the other pair consisting of cores 47 and 48. Each of the pairs of cores has a winding thereon which is connected to one of the common load resistors 36 and 37. More specifically, cores 45 and 46 have windings 26 and 27 thereon which are connected to one terminal 56 of resistor 36 through diodes 29 and 28, respectively. Similarly the cores 47 and 48 have windings 32 and 33 thereon which are connected to a terminal 57 of load resistor 37 through diodes 34 and 35, respectively. The other terminals of the two load resistors 36 and 37 are connected to the center tap 59 of the secondary winding 30 of transformer 50, the primary of which is connected to a driving source 51 which may be a 115 v. 400 c.p.s. A-C source. It will be observed that the upper terminal 52 of the center tapped secondary winding 30 is connected to the winding 27 of one pair of windings and the winding 33 of the other pair of windings. Similarly the other end terminal of the center tapped secondary winding 30 is connected to a winding 26 of one pair of windings and winding 32 of the other pair of windings. Thus, at any given half cycle of the driving current one winding of each of the two pairs of windings will be conductive. For example, windings 27 and 33 will both be conductive when the terminal 52 of the center tap winding is positive. Similarly, windings 26 and 32 will be conductive when the terminal 53 of the center tap conductor 30 is positive. When any two windings are conductive, the other two windings are nonconductive due to the presence of the diodes 29, 28, 34, and 35. Thus, there will be produced at the terminal 39 an 800 c.p.s. signal since both the negative and the positive half cycles of the 400 c.p.s. source 51 will find a path through load resistors 36 and 37.

Due to the presence of the diodes 29, 28, 34 and 35, the voltages across the load resistors 36 and 37 will contain a large D-C component, with the voltage across the resistor 37 being negative measured from the ground 58 to the center tap 61 and the voltage across the resistor 36 being positive measured from the tap 59 to the junction 56. Thus the voltage at the junction 56 will be positive or negative depending upon whether the voltage drop across resistor 36 is greater or less than the voltage drop across resistor 37.

In the absence of any magnetic biasing of the cores 45 through 48, the currents through the windings 26 and 27 will equal the currents through the windings 32 and 33 so that the D-C voltage drop across the resistor 37 is equal to the D-C voltage drop across resistor 36, with the result that the voltage on the output terminal 39 is zero; which is the null condition as described hereinbefore.

In the actual construction of the magnetic amplifier the cores 45–48 can be toroidal in nature and stacked one upon the other with the windings 26, 27, 32, and 33 independently wound one each on the cores 45–48 and the windings 10, 12, 14, 24 and 24' being wound around all four cores. Each of windings 10, 12, 14, 24 and 24' function to individually cause magnetic bias in all four cores 45–48 in the same magnetic polarity.

In the negative feedback loop which comprises the windings 24 and 24' and resistors 21, 22, and 23, the resistors 22 and 23 have a connection therebetween running to the center tap 59 of the secondary winding of transformer 50. The said resistors 22 and 23 are large to prevent any appreciable diversion of current therethrough from the load resistors 36 and 37, which are of a much lower value. The resistor 21 in the negative feedback loop can be varied to control the amount of current flowing through the winding 24 and 24' and therefore determine the impedance gain in the feedback loop. Since the value resistor 21 is small enough to divert an appreciable amount of current from load resistors 36 and 37 it cannot be connected to the center tap of secondary winding 30. It should be noted that the connection between the resistors 22 and 23 to the center tap of secondary winding 30 is provided to insure that the potential at the other terminals of resistors 22 and 23 corresponds substantially to the potentials across the output load resistors 36 and 37.

Before discussing the detailed operation of the circuit, it should be noted that the dots located near each winding are conventional notation and simply mean that current flowing into the winding from the dot side will always produce magnetic flux of the same polarity in the core on which it is wound as will be produced by current flowing into the dot side of any winding wound thereon.

In particular circuit, FIG. 1, a bias winding 12 is provided as well as an input signal winding 10. The use of the bias winding insures that the input signal current in the winding 10 must exceed the biasing current winding 12 before the magnetic amplifier moves into the positive magnetic region of operation. As long as the input signal is less than the biasing signal, the magnetic amplifier is operating in the negative region of operation which is the area to the left of the ordinate of the curve of FIG. 2. In such region of operation, the output voltage on the output terminal 39 (FIG. 1) is negative so that the potential at the junction 60 is also negative. Under these circumstances diode 42 is conductive so that the capacitor 19 can become negatively charged as indicated in FIG. 1. Thus the base electrode of transistor 20 is positive with respect to the emitter thereof since the lower plate or positive plate of the capacitor 19 is connected to the base of transistor 20 through resistor 16.

If the output voltage on output terminal 39 should become more negative, the capacitor 19 will charge more negatively through the diode 42. On the other hand, if the output voltage on the output terminal 39 should become more positive, i.e., less negative, but still not positive, then the capacitor 19 will discharge in a path extending from the positive plate of the capacitor 19 through winding 24', load resistor 37, load resistor 36, feedback winding 24, and transistor 20 to the other plate of capacitor 19.

Although it appears that the actual resistance presented to the capacitor 19 in its discharge path is equal to the total resistance of the two windings 24 and 24', and the load resistors 36 and 37, in parallel with resistors 18 and 17, such is not the case. Due to the negative feedback characteristics of the circuit, the actual resistance of the discharge of the capacitor is determined primarily by the impedance gain of the feedback loop. More specifically, when the capacitor 19 is charging negatively, the current through the windings 24 and 24' is in such a direction as to resist the increasing negative potential at the output terminal 56. In other words, the current through the negative feedback windings 24 and 24' is such as to tend to increase the potential of the output voltage in a positive direction. Of course, the potential of the output signal does not actually increase in a positive direction since it is only a feedback action and is dominated by the input signals on windings 10 and 12.

When the capacitor 19 discharges, the current through the windings 24 and 24' is of a polarity as to resist the decrease in negative potential on the output terminal 56. Worded in another way, the current through the negative feedback windings 24 and 24' operates in a reverse negative feedback manner and tends to make the potential of the output signal more negative. Due to this characteristic, the actual impedance presented to the capacitor 19 is determined by the voltage change across the resistors 22 and 23 (which is the equivalent of the voltage change at the output terminal 56) divided by the current discharge from capacitor 19 through the windings 24 and 24'. Such voltage-over-current ratio defines the impedance in this particular instance accurately and is much higher than the actual values of resistors 36 and 37. By this means the size of the capacitor required to produce a given time constant is much less than would be required if the capacitor were connected directly across the output of the amplifier or employed at the input of the amplifier.

It should be noted that the values of resistors 22 and 23 and the series arangement of resistors 17 and 18 are several orders higher than the values of resistors 36 or 37, perhaps 500 times as large, and are also considerably larger than voltage-over-current impedance presented to capacitor 19.

As discussed above, the gain impedance of the negative feedback loop is determined by the voltage change at the output terminal 39 divided by the current flow through the feedback windings. If the combined resistance of resistors 17, 18, 22, and 23 presented to the windings 24 and 24' is small, then the negative feedback current is large, and the negative feedback effect is large. Thus relatively small voltage changes will take place at the output terminal 56 for relatively large current flows through the windings 24 and 24'.

On the other hand, if the combined resistance of resistors 16, 17, 18, 22, and 23 is large, then the current flow through the feedback windings 24 and 24' is small so that the negative feedback effect is small and relatively large voltage changes will take place on the output terminal 39 for relatively small current flows through feedback windings 24 and 24'. In summary, the impedance gain in the negative feedback loop increases as the aforementioned combined resistance increases and becomes less as said combined resistance decreases.

Since the impedance gain of the feedback loop is determinative of the charge rate of the capacitor 19, it is apparent that by changing the value of the potentiometer 17, and thus changing the said combined resistance, the charging rate of capacitor 19 can be varied.

Figure 2:
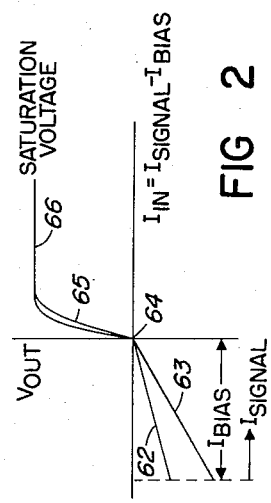
FIG. 2 shows characteristic curves of the structure with different time constants provided in the negative operating region.

In FIG. 2 the curves 62 and 63 represent the operation in the negative operating range for two different settings of the potentiometer 17. The upper curve 62 represents the condition where the resistance of the potentiometer has been reduced below that represented by the lower curve 63. That is to say, the lower curve 63 represents a higher resistance setting of the potentiometer 17 than does the curve 62.

The circuit of FIG. 1 involved in the negative operating region is composed of linear elements, and since it is employed in both charging and discharging the capacitor 19, the time constant for charging and discharging of said capacitor 19 is the same, and may be varied merely by changing the setting of the potentiometer 17.

From the foregoing discussion, it is apparent that once the capacitor 19 has acquired a negative charge, the magnetic amplifier is operating in the negative region, and a finite period of time, determined by the time constant of the circuit, is required for the charge on the capacitor to respond to any change in the value of the input signal current supplied to input winding 10. Since capacitor 19 has a direct D-C connection to the output terminal 39 through the winding 24, the signal on the output terminal 39 will also be delayed a corresponding time interval following a change in the input signal supplied to the winding 10. Consequently, if the error signal, that is the signal supplied to the input winding 10 should become greater than the biasing current supplied to the bias winding 12, a predetermined interval of time is required before the potential on output terminal 39 changes from a negative potential to a positive potential. Thus, short term excursions of the input signal above the magnitude of the biasing current will not produce a positive output signal on the output terminal 39.

However, if the input signal to winding 10 should exceed the biasing current for a predetermined interval of time, then the capacitor 19 will discharge completely and the potential of the output terminal 39 will pass through the null position and into the positive area of operation.

As discussed briefly hereinbefore, the winding 14 is a positive feedback winding so that when the potential of the point terminal 56 becomes positive, the current through positive feedback winding 14 functions to aid the magnetization of the cores in the same polarity as caused by the input signal supplied to winding 10. Such positive feedback action is cumulative and saturation of the four cores 45 to 48 is very rapid, producing what can readily be termed a bistable condition in the operation of the magnetic amplifier.

In FIG. 2 the point 64 represents the null operating point wherein the biasing magnetization of the cores 45–48 is at zero. Once the operation passes the null position into the positive region (the first quadrant of the curve of FIG. 1), the positive feedback action causes a rapid rise shown by portion 65 of the curve to the positive saturation level 66.

It is to be noted that the form of the invention shown and described herein is but a preferred embodiment thereof and that various changes may be made in the design of the circuit without departing from the spirit or the scope of the invention.

I claim:
1. Magnetic amplifier means comprising:
 (a) first and second magnetic core means;
 (b) driving source means;
 (c) center tapped output load means;
 (d) first and second driving winding means wound around said first and second magnetic core means respectively;
 (e) first and second diode means connecting first terminals of said first and second driving winding means across said center tapped load means;
 (f) driving source means for driving said first and second driving winding means in push-pull manner;
 (g) input winding means wound in common upon said first and second magnetic core means;
 (h) positive feedback means wound in common upon said first and second magnetic core means and connected across said center tapped load means;
 (i) negative feedback circuit means comprising a series arrangement of impedance means and negative feedback means wound in common upon said first and second magnetic core means and connected across said center tapped load means;
 (j) time constant means including capacitive means and a discharge path therefor;
 (k) and switching means for connecting said time constance means across said impedance means when the output signal of said magnetic amplifier means crosses a predetermined voltage threshold.

2. Magnetic amplifier means in accordance with claim 1 in which said switching means comprises:
 (a) a diode connected with a polarity to cause said capacitive means to charge when said output signal of said magnetic amplifier crosses said predetermined threshold,
 (b) and electron valve means having a control electrode and which is connected to provide a discharge path for said capacitive means around said diode when said electron valve is conductive;
 (c) said control electrode being connected to respond to the potential across said capacitive means to cause said electron valve to become conductive when the potential across said capacitive means crosses a predetermined threshold.

3. Magnetic amplifier means in accordance with claim 1 in which:
 the negative feedback means coacts with said time constant means, when said time constant means is connected across said impedance means, to decrease the negative feedback impedance and to cause the effect of said negative feedback winding means to dominate over the effect of said positive feedback winding means;
 the negative feedback means being further constructed, when said time constant means is disconnected from said impedance means, to increase the negative feedback impedance to cause the effect of said positive feedback means to dominate over the effect of said negative feedback means.

4. In a magnetic amplifier means including:
 (a) first and second magnetic core means;
 (b) first and second driving winding means wound on said first and second magnetic core means respectively;
 (c) driving means constructed to drive said first and second driving winding means in push-pull manner;
 (d) input winding means wound in common upon said first and second magnetic core means;
 (e) means for supplying input signals to said input winding means;
 (f) first impedance means connected across said first and second driving winding means and having an output terminal means thereon;
 (g) positive feedback winding means wound in common upon said first and second magnetic core means and energized by the output signal appearing at said output terminal means;
 (h) negative feedback circuit means comprising:
  (1) negative feedback winding means wound in common upon said first and second magnetic core means and energized by the output signal appearing at said output terminal means;
  (2) second impedance means connected in series with said negative feedback winding means;
  (3) third impedance means comprising capacitive means,
  (4) switching means responsive to a signal of a magnitude less than a predetermined signal level at said output terminals to connect said third impedance means across said second impedance means,
  (5) said negative feedback winding means constructed to have a greater magnetizing effect on said first and second magnetic core means than said positive feedback winding means when said third impedance means is connected across said second impedance means, and a lesser magnetizing effect on said first and second magnetic core means than said positive feedback means when said third impedance means is disconnected from said second impedance means.

5. Magnetic amplifier in accordance with claim 4 in which said switching means comprises:
 (a) a diode connected with a polarity to cause said capacitive means to charge when said output signal of said magnetic amplifier crosses said predetermined level,
 (b) and electron valve means having a control electrode and which is connected to provide a discharge path for said capacitive means around said diode when said electron valve is conductive,
 (c) said control electrode being connected to respond to the potential across said capacitive means to cause said electron valve to become conductive when the potential across said capacitive means crosses a predetermined threshold.

6. Magnetic amplifier means in accordance with claim 4 in which:
 the negative feedback means coacts with said time constant means when said time constant means is connected across said impedance means, to decrease the negative feedback impedance and to cause the effect of said negative feedback winding means to dominate over the effect of said positive feedback winding means;

the negative feedback means being further constructed, when said time constant means is disconnected from said impedance means, to increase the negative feedback impedance to cause the effect of said positive feedback means to dominate over the effect of said negative feedback means.

References Cited

UNITED STATES PATENTS 2,977,481   3/1961   Rosa _____ 330—8 X
2,999,234   9/1961   Creusere _____ 330—8 X ROY LAKE, *Priamry Examiner.*

NATHAN KAUFMAN, *Examiner.*